(12) United States Patent
Kogure et al.

(10) Patent No.: US 7,375,281 B2
(45) Date of Patent: May 20, 2008

(54) POWER-SUPPLYING APPARATUS FOR SLIDING STRUCTURE

(75) Inventors: Naoto Kogure, Shizuoka (JP); Hironori Ochiai, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/650,472

(22) Filed: Jan. 8, 2007

(65) Prior Publication Data
US 2007/0158108 A1 Jul. 12, 2007

(30) Foreign Application Priority Data
Jan. 10, 2006 (JP) ............................. 2006-002334

(51) Int. Cl.
*H02G 3/04* (2006.01)
(52) U.S. Cl. .................. 174/72 A; 174/68.1; 174/135; 174/72 C; 138/111; 439/34
(58) Field of Classification Search ............. 174/72 A, 174/68.1, 68.3, 69, 97–99 R, 135, 72 C, 174/70 R, 70 C; 439/34, 162, 111, 207; 138/111, 157, 158, 166, 167, 168
See application file for complete search history.

(56) References Cited

U.S. PATENT DOCUMENTS

| | | | | |
|---|---|---|---|---|
| 5,921,782 A | * | 7/1999 | Yamaguchi et al. ........... 439/34 |
| 6,076,883 A | * | 6/2000 | Labonde et al. ............ 296/155 |
| 6,321,489 B1 | * | 11/2001 | Murofushi et al. ........... 49/360 |
| 6,340,199 B1 | * | 1/2002 | Fukumoto et al. .......... 296/155 |
| 6,603,076 B2 | * | 8/2003 | Doshita et al. ............ 174/72 A |
| 6,811,404 B2 | * | 11/2004 | Doshita et al. ............... 439/34 |
| 2002/0005014 A1 | | 1/2002 | Doshita et al. ............... 49/360 |
| 2003/0184118 A1 | | 10/2003 | Sano et al. .................. 296/155 |

FOREIGN PATENT DOCUMENTS

| JP | 2001-354085 | 12/2001 |
|---|---|---|
| JP | 2005-20895 | 1/2005 |

* cited by examiner

*Primary Examiner*—Dhiru R. Patel
(74) *Attorney, Agent, or Firm*—Kratz, Quintos & Hanson, LLP

(57) ABSTRACT

A power-supplying apparatus for a sliding structure including: a wiring harness arranged between a vehicle body and a sliding structure slidably mounted on the vehicle body; a protector mounted on the sliding structure for receiving the wiring harness; a holder attached to the wiring harness for moving in the protector together with the wiring harness; a first resilient member mounted on the holder along the wiring harness from the holder toward a harness outlet of the protector for urging upward the wiring harness opposed to a harness slack; and a second resilient member mounted on the holder to bend the wiring harness in a loop shape in response to a movement of the holder owing to a slide of the sliding structure.

4 Claims, 6 Drawing Sheets

POWER-SUPPLYING APPARATUS FOR SLIDING STRUCTURE

CROSS REFERENCE TO RELATED APPLICATIONS

This application is on the basis of Japanese Patent Application No. 2006-002334, the contents of which are hereby incorporated by reference.

BACKGROUND OF THE INVENTION

1. Field of the Invention

The present invention relates to a power-supplying apparatus mounted on a sliding structure such as a sliding door of a vehicle for constantly supplying electricity to such as auxiliaries of the sliding structure.

2. Description of the Related Art

FIGS. 5 to 6 show an embodiment of a conventional sliding door (for example, refer to Japanese Published Patent Application No. 2001-354085).

This power-supplying apparatus 40 is installed on a sliding door 1 of a vehicle, and includes a protector 142 having a base and a cover (not shown) made of synthetic resin for receiving a wiring harness 143, and a metallic flat spring 144 assembled inside the protector 142 for urging upward the wiring harness 143.

The protector 142 is composed of a substantially semicircular part for receiving the wiring harness 143 and a slim extended part extended from a rear of the semicircular part, and has a vertical base 149, a round wall 150 disposed along a top end of the base 149, an oblong lower opening 145 for extending the wiring harness, and a front opening 151.

The protector 142 is vertically interposed between a metallic door panel 152 and a door trim made of synthetic resin (not shown). The wiring harness 143 is curved horizontally at the lower opening 145, arranged to a vehicle body 147, and fixed to a holder (not shown) at the vicinity of a step 148. Further, the wiring harness 143 is arranged into an inside of the sliding door through the front opening 151, and connected to the auxiliaries at the sliding door or a harness with connectors in order to constantly supply electricity.

The wiring harness 143 is made of a plurality of electric wires covered by a flexible corrugate tube made of synthetic resin. The corrugate tube is made by arranging alternately circular furrows and ridges. The wiring harness 143 is extended from the front opening 151 to a harness holder at the vehicle body 147.

As shown in FIG. 5, at almost fully closed state of the sliding door 1, the wiring harness 143 is pulled backward and bends the flat spring 144 downward. At a half-open state of the sliding door, the wiring harness is about to slack downward, but urged upward by the flat spring 144 to absorb the slack. As shown in FIG. 6, at almost fully open state of the sliding door 1, the wiring harness 143 is pulled forward and bends the flat spring 144 downward.

However, there is a problem that a space for components and the auxiliaries in the sliding door is reduced, because a conventional structure of the power supplying apparatus is to lift the wiring harness 143 with the flat spring 144 for absorbing the slack, and especially when an open/close stroke of the sliding door 1 is large, a height of the protector 142 should be large. Further, the conventional structure needs the metallic flat spring 144 and a bracket for fixing the flat spring 144, and resultingly a cost of the power-supplying apparatus is increased. Further, a lot of time is needed for fixing the flat spring 144.

Therefore, Japanese Published Patent Application No. 2005-20895 discloses a power-supplying apparatus which does not use a flat spring for preventing an enlarged protector, and a loop part is openable by a resiliency of a wiring harness with a harness guiding member, so that a height of the protector can be lower than that of the conventional protector, and a flexibility of arranging components in a sliding door is increased.

However, in the power-supplying apparatus of Japanese Published Patent Application No. 2005-20895, a resilient member such as a spring is needed to be used for urging obliquely downward a second guiding roller composing a harness guiding members. Because the resilient member is contracted when the sliding door is fully open, a pulling force to the wiring harness is increased. Thus, the wiring harness may be broken. Further, a structure for fixing and sliding guiding rollers composing the harness guiding members is needed. Therefore, a structure of the power-supplying apparatus becomes complex, and a cost of the power-supplying apparatus is increased. Further, an assembling work of the power-supplying apparatus becomes difficult.

Accordingly, an object of the present invention is to provide a power-supplying apparatus for a sliding structure which makes a structure thereof simple, allows a load to a wiring harness to be reduced, so that a protector can be downsized.

SUMMARY OF THE INVENTION

In order to attain the object, according to the present invention, there is provided a power-supplying apparatus for a sliding structure including:

a wiring harness arranged between a vehicle body and a sliding structure slidably mounted on the vehicle body;

a protector mounted on the sliding structure for receiving the wiring harness;

a holder attached to the wiring harness for moving in the protector together with the wiring harness;

a first resilient member mounted on the holder along the wiring harness from the holder toward a harness outlet of the protector for urging upward the wiring harness opposed to a harness slack; and a second resilient member mounted on the holder to bend the wiring harness in a loop shape in response to a movement of the holder owing to a slide of the sliding structure.

Preferably, the second resilient member is so formed as to bend the wiring harness in a maximum loop when the sliding structure is half-open.

Preferably, the first resilient member is so formed as to press the wiring harness against an inner wall of the protector when the sliding structure is closed.

Preferably, the first resilient member is interposed between the looped wiring harnesses when the sliding structure is fully open.

These and other objects, features, and advantages of the present invention will become more apparent upon reading of the following detailed description along with the accompanied drawings.

DETAILED DESCRIPTION OF THE PREFERRED EMBODIMENTS

An embodiment of a power-supplying apparatus for a sliding structure will be explained with reference to FIGS. 1 to 4.

Figure 1:
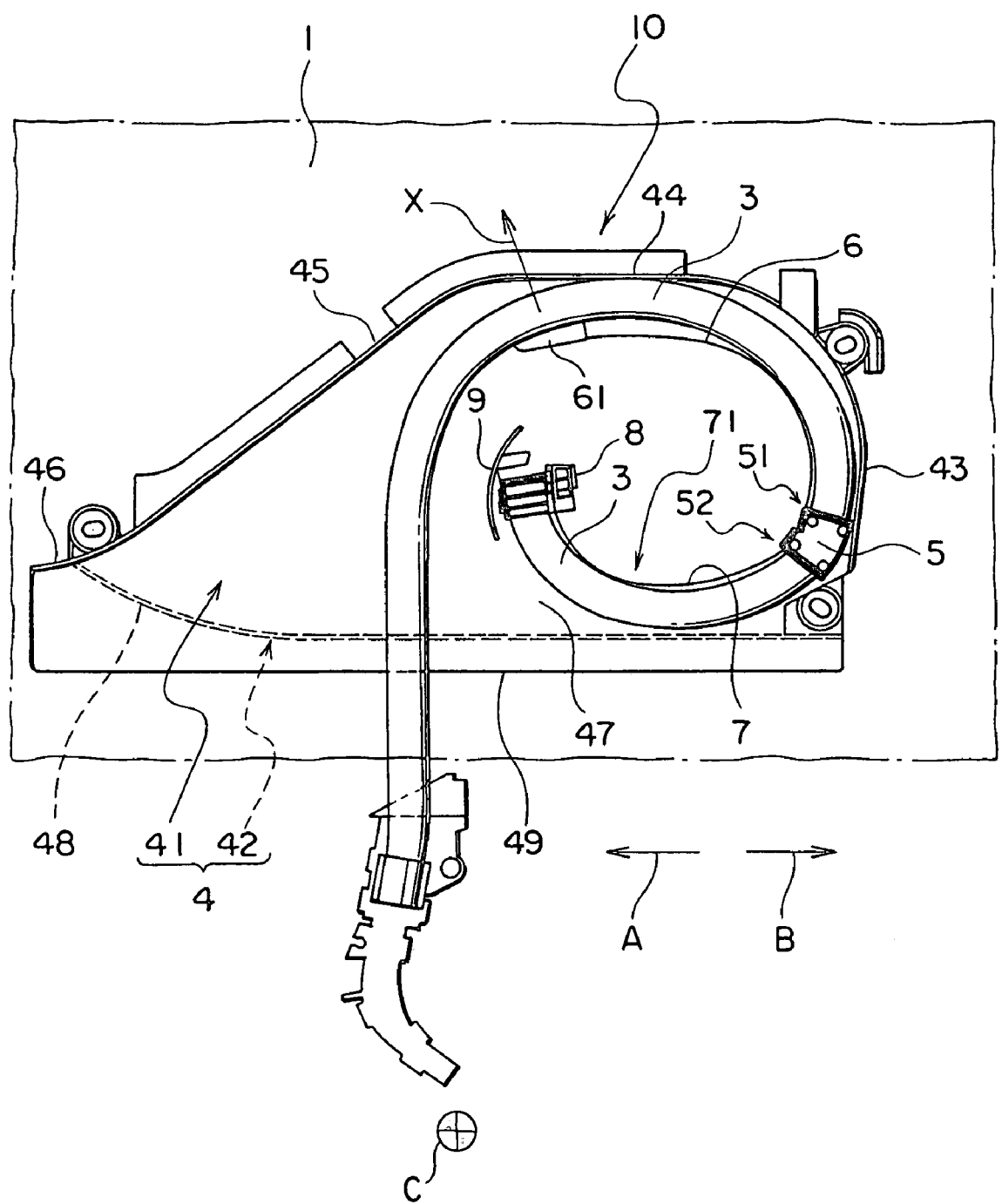
FIG. 1 is a front view of a half-opened sliding door showing an embodiment of a power-supplying apparatus according to the present invention.
Figure 2:
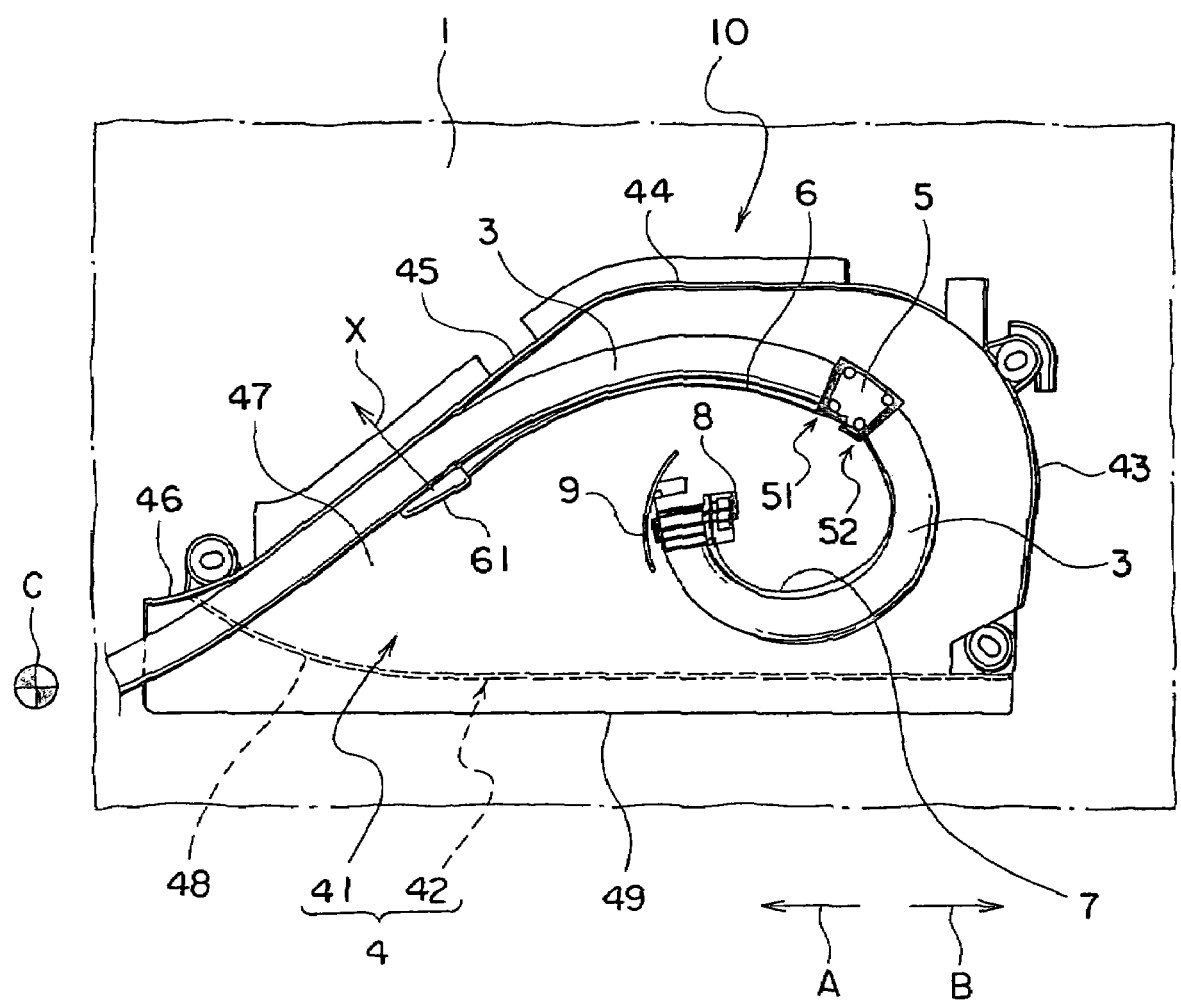
FIG. 2 is a front view of a closed sliding door showing the embodiment of the power-supplying apparatus according to the present invention.
Figure 3:
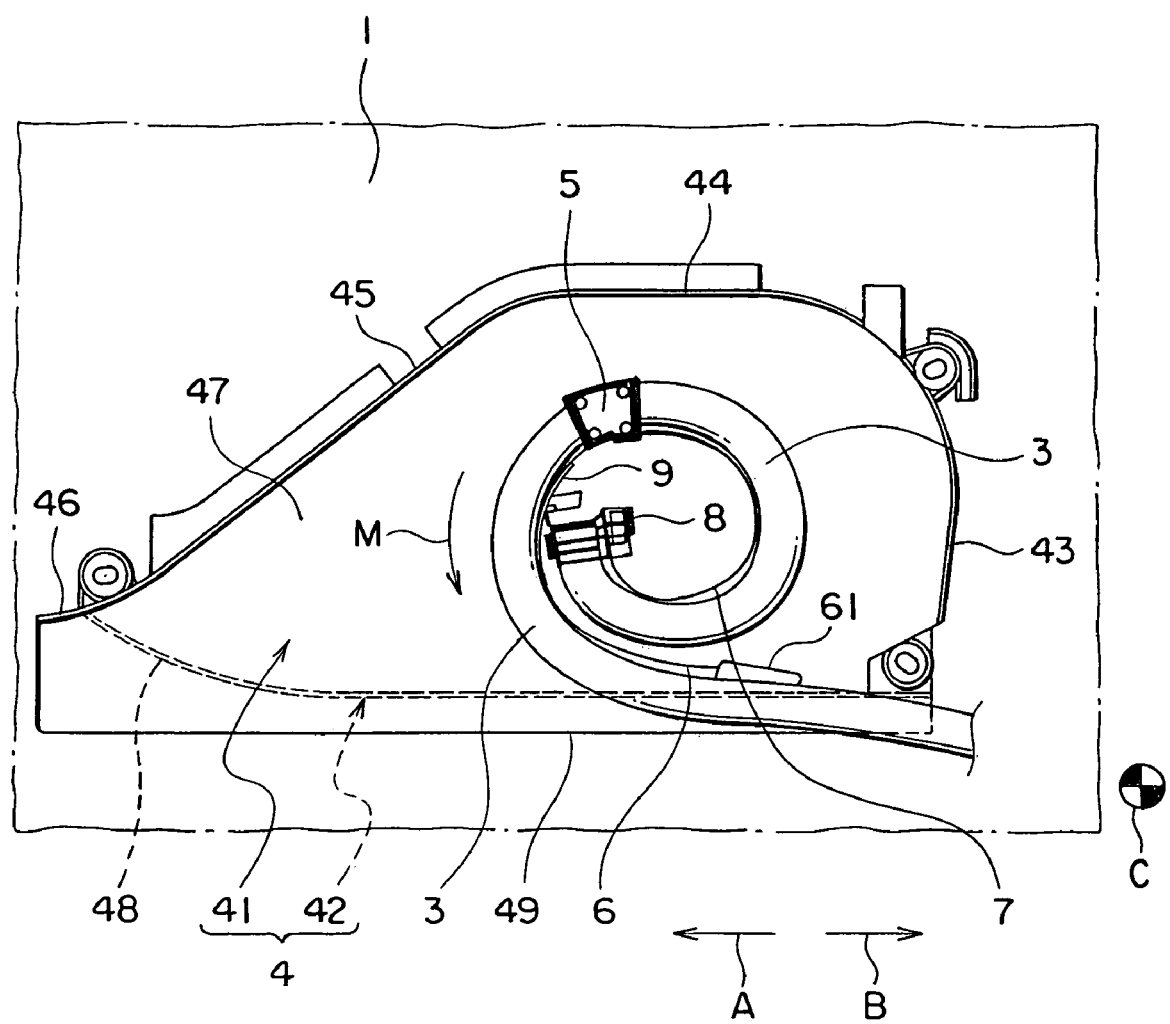
FIG. 3 is a front view of a fully-opened sliding door showing the embodiment of the power-supplying apparatus according to the present invention.

In FIGS. 1 to 3, the power-supplying apparatus 10 includes a wiring harness 3, a protector 4, a holder 5, a first flat spring 6 as a first resilient member, and a second flat spring 7 as a second resilient member.

A sliding door 1 is a sliding structure, for example, a sliding door of a minivan or a passenger vehicle. Various auxiliaries such as a power window motor, a door lock unit, a speaker are mounted in an interior of the sliding door 1. The various auxiliaries are connected to a connector (not shown) mounted on an end of the wiring harness 3. Electricity is supplied to the auxiliaries via the wiring harness from the vehicle body (not shown).

The other end of the wiring harness 3 is connected to a connector of a wiring harness at the vehicle body. The wiring harness 3 and a protector (not shown) mounted on an inner panel of the sliding door 1 are arranged in the sliding door 1.

Figure 6:
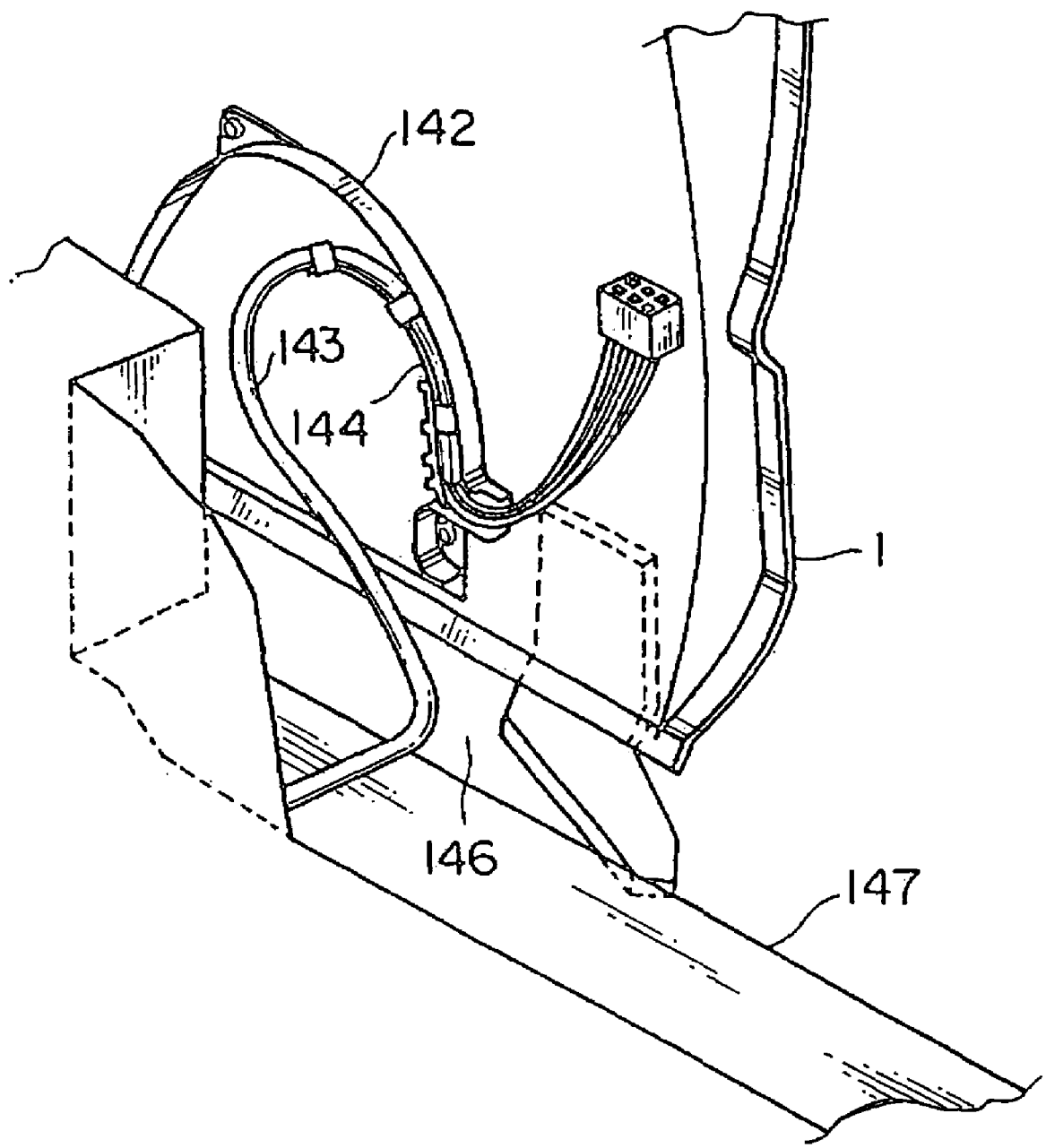
FIG. 6 is a perspective view of an almost fully opened sliding door showing the embodiment according to the conventional power-supplying apparatus.

The sliding door 1 is slidably mounted on the vehicle body 147 (see FIG. 6). The sliding door slides in an open direction A and in a close direction B against the vehicle body 147. (However, when opening the sliding door 1, the sliding door 1 is once pulled out to a side of the vehicle body 147. When closing the door, vice versa.) An inner panel is mounted on the sliding door 1 at the vehicle body 147 side. Further, a hinge roller is mounted on a bottom end of the sliding door 1 for slidably engaging with a rail (not shown) mounted on a bottom part of the vehicle body 147.

As well-known, the wiring harness 3 includes a plurality of electric wires, a connector attached to ends of the electric wires, and the like. The wiring harness 3 is arranged between the vehicle body 147 and the sliding door 1 as the sliding door slidably mounted on the vehicle body 147.

The electric wire includes a conductive core wire and a coating part made of insulating synthetic resin for coating the core wire. The connector includes a conductive terminal fitting and an insulating connector housing. The terminal fitting is attached to an end of the electric wire and electrically connected to the core wire. The connector housing is formed in a box shape and receives the terminal fitting.

The protector 4 is, as explained at the prior art, composed of a base 41 and a cover 42, and has about a half height than the conventional protector. Conventionally, a harness receiving part is in substantially a semicircular shape. This protector 4 is formed compact and surrounded by a surrounding wall composed of a short vertical front end wall part 43, a short horizontal wall part 44 at a ceiling side extended upward from the front end wall part 43 and backward in a curving manner, a long wall part 45 extended from the ceiling side wall part 44 backward and obliquely downward in a straight manner, and a short wall part 10 extended horizontally backward from a slant wall part 45, and a vertical oblong substrate 47 perpendicular to the surrounding wall. A horizontal length of the protector 2 is as same as that of the conventional power-supplying apparatus.

Incidentally, in FIG. 1, only a harness guiding wall 48 disposed at a bottom end of the cover 42 and curved outward in a skirt shape is shown by a dotted line, and other parts of the cover 42 are omitted so as to make an inside of the base 41 visible. A harness outlet 49 is formed in between the bottom end of the base 41 and the bottom end of the cover 42, namely, the outwardly curved harness guiding wall 48.

An opening (not shown) for the harness outlet is formed at a middle height (up down direction in FIG. 1) of the vertical substrate 47 of the base 41 abutting on a metallic door panel of the sliding door 1. The wiring harness 3 guided out through the opening to a rear side of the base 41 is connected to the other wiring harness, and auxiliaries (a power window motor, a door lock unit, a switching unit, a speaker and the like). Further, a holding part 8 for holding the wiring harness 3 and a regulating wall 9 for regulating a movement of the wiring harness 3 are formed around the opening of the substrate 47.

The holding part 8 holds the wiring harness 3, and fastens an end of a second flat spring 7. The regulating wall 9 regulates a movement of a slack of the wiring harness 3 when the sliding door 1 moves from the half-open state in the open direction A, and makes the slack of the wiring harness 3 bend in a loop shape when the sliding door 1 is fully opened.

The holder 5 is formed in a hollow square pole shape and made of synthetic resin. The holder 5 has a path part (not shown) corresponding to an outside shape of a corrugate tube (not shown) covering the wiring harness 3. Further, the holder 5 forms the path part with a pair of clipping parts. A biting projection is formed on an inner wall of the path part. The biting projection bites an outer wall of the corrugate tube so that a rotation and a movement of the corrugate tube against the holder 5 is regulated.

The holder 5 includes a first fixing part 51 for fixing the first flat spring 6 and a second fixing part 52 for fixing the second flat spring 7. An end of the first flat spring 6 is fastened to the first fixing part 51 so that the first flat spring 6 is extended from the holder 5 toward the harness outlet 49 along the inner radius of the wiring harness 3. An end of the second flat spring 7 is fastened to the second fixing part 52 so that the second flat spring 7 is clipped between the holding part 8 of the protector 4 and the second fixing part 52 along the inner radius of the wiring harness 3.

An attaching position of the holder 5 to the wiring harness 3 is properly set according to a length of the wiring harness 3, a sliding range of the sliding door 1, a slack absorbing length of the wiring harness 3.

The first flat spring 6 is formed in a flat shape by a resilient metallic member, or the like. A width of the first flat spring 6 is allowed to be received in the protector 4. A thickness and a length of the first flat spring 6 is properly set so that the resilient force of the first flat spring 6 is strong enough to surely pull up the wiring harness 3 in a direction X opposed to the harness slack in the protector 4.

As shown in FIG. 2, the first flat spring 6 is formed in an arc shape for pressing the wiring harness 3 against a horizontal wall part (inner wall) 45 of the protector 4 when the sliding door 1 is closed. The first flat spring 6 includes an abutting member 61 having a triangle section at the other end. The abutting member 61 abuts on the wiring harness 3 and prevents the wiring harness 3 from being damaged.

The second flat spring 7 is formed in a flat shape by a resilient metallic member, or the like. A width of the second flat spring 7 is allowed to be received in the protector 4. A thickness of the second flat spring 7 is properly set so that the second flat spring 7 bends the wiring harness 3 in a loop shape between the holder 5 and the holding part 8 in response to the movement of the holder 5 owing to the slide of the sliding door 1, and a loop part 71 formed by the bending of the second flat spring 7 is deformable in response to the movement of the holder 5. As shown in FIG. 2, the second flat spring 7 is formed in an arc shape for positioning the holder 5 at a specific position in the protector 4 when the sliding door 1 is closed.

Because the power-supplying apparatus 10 includes the holder 5 moving together with the wiring harness 3 in the protector 4, the first flat spring 6, and the second flat spring 7, the wiring harness 3 is held in a state pulling up in the direction X opposed to the harness slack by the first flat spring 6 in the protector 4. Further, because the holder 5 is moved together with the wiring harness 3 owing to stiffness of the wiring harness 3 or the like, the second flat spring 7 is allowed to bend the wiring harness 3 in a loop shape.

Incidentally, in this embodiment, each of the first flat spring 6 and the second flat spring 7 is formed by a single flat spring. However, various forms can be used, for example, a plurality of flat springs are overlapped to set the resiliency. Further, the first flat spring 6 and the second flat spring 7 may be formed integrally.

Next, an example of an operation of the power-supplying apparatus 10 will be explained with reference to FIGS. 1 to 3.

In the closed state of the sliding door 1 as shown in FIG. 2, the wiring harness 3 is guided out from the rear end of the harness outlet 49 to the vehicle body 147 and pulled backward about a harness holder C (in FIG. 2, the center of the harness holder is indicated by a mark) at a step side of the vehicle body 147. At this time, the first flat spring 6 pulls up the wiring harness 3 in the direction X, and presses the wiring harness 3 against the horizontal wall part 45 of the protector 4. Further, the second flat spring 7 positions the holder 5 at the specific position in the protector 4, and the loop part 71 is formed in an arc shape having a standard curve R0.

When the sliding door 1 is moved from the closed state shown in FIG. 2 to the half-open state shown in FIG. 1 in the open direction A, the wiring harness 3 will slack largely between the sliding door 1 and the vehicle body 147, however, the first flat spring 6 pulls up the wiring harness 3 in the direction X. Then, the holder 5 is moved in the close direction B together with the wiring harness 3. Then, the second flat spring 7 bends the wiring harness 3 to the maximum curve R1 larger than the standard curve R0 in response to the movement of the holder 5. Thus, the second flat spring 7 bends the wiring harness 3 in a loop shape along the front end wall part 43 to absorb the slack. Namely, when the sliding door 1 is half-open, the second flat spring 7 bends the wiring harness 3 in a maximum loop.

When the sliding door 1 slides from the half-open state shown in FIG. 1 to the fully open state shown in FIG. 3, the wiring harness 3 is pulled forward from the harness outlet 49 about the harness holder C (disposed in front of the protector 4). As shown in FIGS. 1 and 3, the holder 5 and the first flat spring 6 are moved in a direction M together with the wiring harness 3. At this time, the first flat spring 6 is moved along the regulating wall 9 together with the wiring harness 3, and curved against its abutting force. The holder 5 is moved together with the wiring harness 3 to around a top of the holding part 8 of the protector 4. The radius of the second flat spring 7 is reduced to a minimum radius R2 smaller than the standard radius R0 in response to the movement of the holder 5, so that the wiring harness 3 is bent in a loop shape at around the center of the protector 4. Thus, the first flat spring 6 is disposed along the wiring harness 3 which is formed in a loop shape when the sliding door 1 is fully opened, so that the first flat spring 6 prevents the wiring harness 3 from interfering with itself, and prevents a sliding noise.

According to the power-supplying apparatus 10, a load over the wiring harness 3 is reduced when the sliding door 1 is fully open, so that the break of the wiring harness 3 is surely prevented. Further, the assembling of the wiring harness is only attaching the holder 5 to the wiring harness 3 and the structure of the protector 4 is simplified, so that the cost of the power-supplying apparatus 10 is reduced, and the assembling work increases efficiency.

Accordingly, there is provided the power-supplying apparatus 10 which allows the load over the wiring harness 3 to be reduced, and the protector 4 to be downsized. Further, because the resiliency of the first flat spring 6 and the second flat spring 7 is optionally set, the load over the wiring harness 3 is surely reduced.

Further, because the radius of the wiring harness 3 is maximum when the sliding door 1 is half-open, the slack of the wiring harness 3 in the protector 4 is minimized, so that the height of the protector 4 is reduced, and the layout flexibility of the components in the sliding structure is increased.

Further, because the movement of the wiring harness 3 when the sliding door 1 is closed can be regulated, even when the protector 4 is oscillated due to the oscillation of the sliding door 4 via the vehicle body 147, the collision of the protector 4 with the wiring harness 3 is prevented and an occurrence of noise is prevented.

Figure 4:
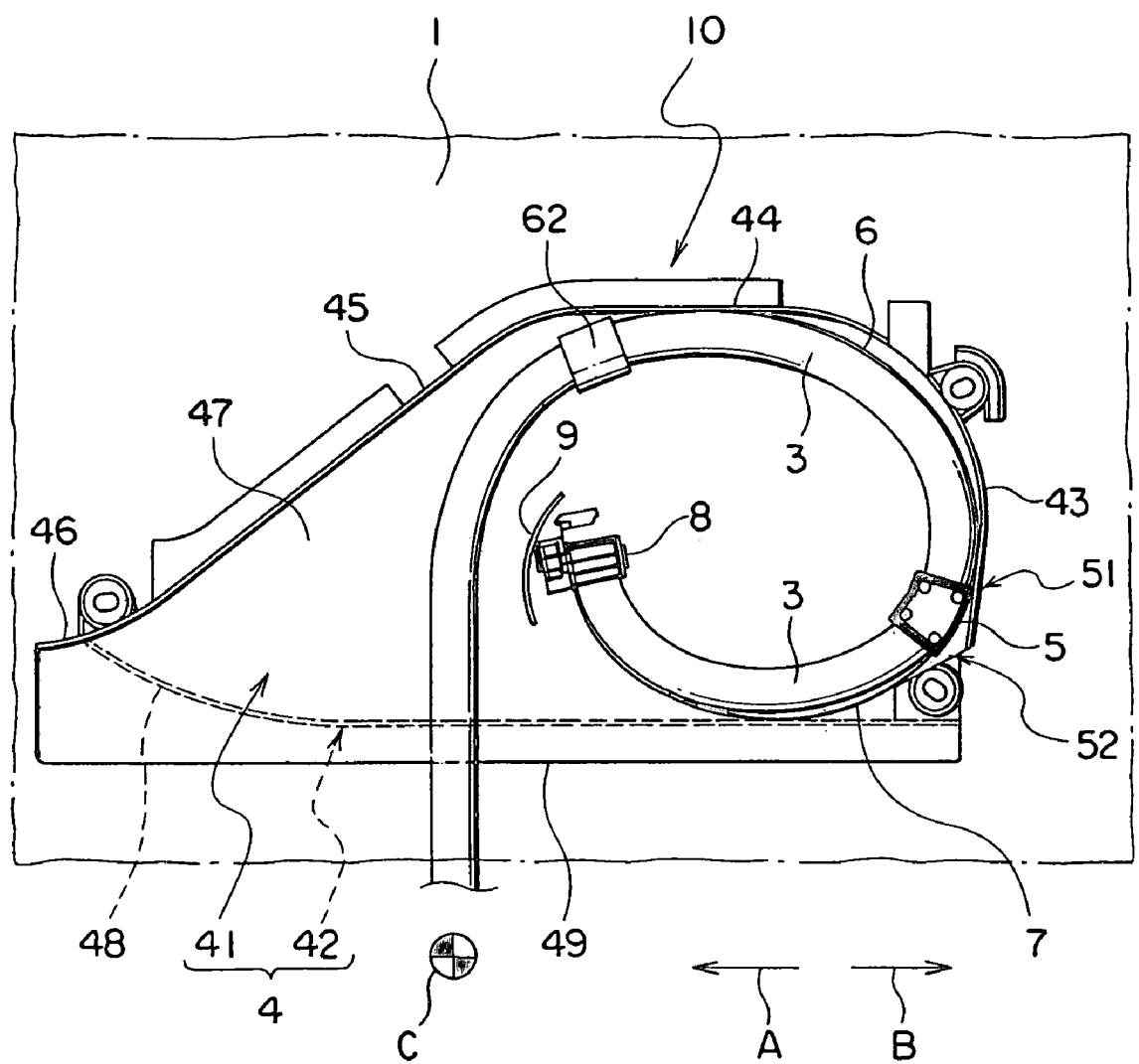
FIG. 4 is a front view of a half-opened sliding door showing another embodiment of the power-supplying apparatus according to the present invention.
Figure 5:
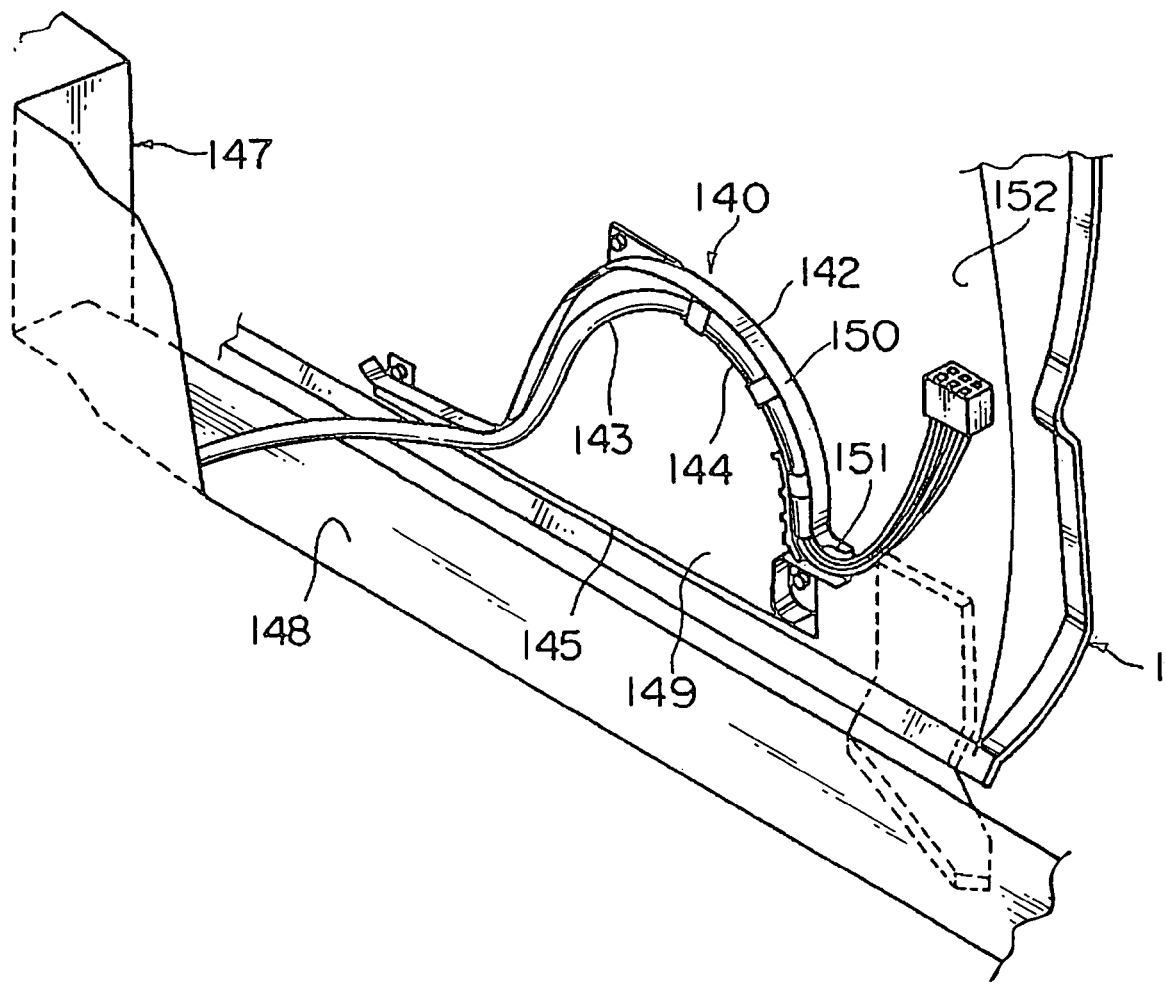
FIG. 5 is a perspective view of an almost fully closed sliding door showing an embodiment according to a conventional power-supplying apparatus.

Incidentally, in the above embodiment, the first flat spring 6 and the second flat spring 7 are mounted on an inner radius of the wiring harness 3. However, the present invention is not limited to this. As shown in FIG. 4, the first flat spring 6 and the second flat spring 7 may be mounted on an outer radius of the wiring harness 3, and pull the wiring harness 3 from the outer radius side. In this structure, instead of the abutting member 61, a holder-shaped fixing part 62 is mounted on an end of the first flat spring 6 to fix the wiring harness 3 to the end of the first flat spring 6. According to this structure, the minimum radius of the flat spring can be increased, so that flexibility of selecting the flat spring is increased.

Further, in the above embodiment, the first flat spring 6 and the second flat spring 7 are used as the first and second resilient members. However, elastic wire or a plurality of elastic wires can be used as the first and second resilient members.

Further, in the above embodiment, the power-supplying apparatus 10 which supplies electricity to the auxiliaries in the sliding door 1 is explained. However, according to the invention, the power-supplying apparatus may supply electricity to the auxiliaries attached to a slidable roof panel of the vehicle body 147. The power-supplying apparatus 10 can be used in the other objects except a vehicle.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power-supplying apparatus for a sliding structure comprising:
   a wiring harness arranged between a vehicle body and a sliding structure slidably mounted on the vehicle body;
   a protector mounted on the sliding structure for receiving the wiring harness;
   a holder attached to the wiring harness for moving in the protector together with the wiring harness;
   a first flat spring mounted on the holder along the wiring harness from the holder toward a harness outlet of the protector for urging upward the wiring harness opposed to a harness slack; and
   a second flat spring mounted on the holder to bend the wiring harness in a loop shape in response to a movement of the holder owing to a slide of the sliding structure.

2. The power-supplying apparatus as claimed in claim 1, wherein the second flat spring is so formed as to bend the wiring harness in a maximum loop when the sliding structure is half-open.

3. The power-supplying apparatus as claimed in claim 1, wherein the first flat spring is so formed as to press the wiring harness against an inner wall of the protector when the sliding structure is closed.

4. The power-supplying apparatus as claimed in claim 1, wherein the first flat spring is interposed between the looped wiring harnesses when the sliding structure is fully open.

* * * * *